US010657321B2

(12) United States Patent
Flisakowski et al.

(10) Patent No.: US 10,657,321 B2
(45) Date of Patent: May 19, 2020

(54) EXPLODED-RANGE REFERENCES

(71) Applicant: Apple Inc., Cupertino, CA (US)

(72) Inventors: Shawn Patrick Flisakowski, Saratoga, CA (US); Matthew R. Lehrian, Pittsburgh, PA (US); Edward P. Hogan, Pittsburgh, PA (US); Anukul Kapoor, Pittsburgh, PA (US); Marek R. Telgarsky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/128,306

(22) Filed: Sep. 11, 2018

(65) Prior Publication Data

US 2020/0081968 A1 Mar. 12, 2020

(51) Int. Cl.
*G06F 17/00* (2019.01)
*G06F 40/18* (2020.01)
*G06F 40/103* (2020.01)
*G06F 3/0482* (2013.01)
*G06F 3/0484* (2013.01)

(52) U.S. Cl.
CPC ............ *G06F 40/18* (2020.01); *G06F 40/103* (2020.01); *G06F 3/0482* (2013.01); *G06F 3/0484* (2013.01)

(58) Field of Classification Search
CPC .... G06F 17/246; G06F 17/211; G06F 3/0482; G06F 3/0484; G06F 40/18; G06F 40/103
See application file for complete search history.

(56) References Cited

U.S. PATENT DOCUMENTS

| | | | | |
|---|---|---|---|---|
| 5,371,675 A * | 12/1994 | Greif | ...................... | G06F 40/18 715/220 |
| 5,632,009 A * | 5/1997 | Rao | ...................... | G06T 11/206 715/201 |
| 6,496,832 B2 * | 12/2002 | Chi | ...................... | G06F 17/246 |
| 7,010,779 B2 * | 3/2006 | Rubin | ...................... | G06F 8/30 717/106 |
| 7,171,427 B2 * | 1/2007 | Witkowski | .......... | G06F 16/2264 |
| 8,108,431 B1 * | 1/2012 | Guner | ............... | G06F 16/24561 707/792 |
| 8,773,370 B2 * | 7/2014 | Hogan | .................. | G06F 40/177 345/173 |
| 9,223,771 B2 * | 12/2015 | Lehrian | ............... | G06F 3/04855 |

(Continued)

OTHER PUBLICATIONS

Gray, J., et al, "Data Cube: A Relational Aggregation Operator Generalizing Group-By, Cross-Tab, and Sub-Totals", Kluwer Academic Publishers, 1997, https://doi.org/10.1023/A:1009726021843, Data Mining and Knowledge Discovery, pp. 29-53. (Year: 1997).*

*Primary Examiner* — Laurie A Ries
(74) *Attorney, Agent, or Firm* — Fletcher Yoder PC

(57) ABSTRACT

Systems, methods, and devices for tracking spreadsheet table cells from a base table to an organized table/organized table view, and updating of a formula reference based on the tracked cells are provided. In some embodiments, cells may be tracked to convert a first range of cells in the base table into a second range of cells in the organized table/organized table view, such that the second range of cells includes the same cells as the first range of cells, despite any reorganization of rows and columns. In some embodiments, a summary reference cell that provides a sub-group summary based upon the grouping within the organized table/organized table view may also be provided.

17 Claims, 12 Drawing Sheets

(56) References Cited

U.S. PATENT DOCUMENTS

| | | | | |
|---|---|---|---|---|
| 9,977,772 | B1* | 5/2018 | Samadani | G06F 17/246 |
| 10,140,279 | B2* | 11/2018 | Zia | G06F 17/246 |
| 10,235,429 | B2* | 3/2019 | Meehan | G06F 16/248 |
| 2002/0069221 | A1* | 6/2002 | Rao | G06F 17/245 |
| | | | | 715/227 |
| 2002/0095399 | A1* | 7/2002 | Devine | G06F 16/958 |
| 2004/0205524 | A1* | 10/2004 | Richter | G06F 17/246 |
| | | | | 715/213 |
| 2004/0249852 | A1* | 12/2004 | Aureglia | G06F 17/246 |
| 2005/0015379 | A1* | 1/2005 | Aureglia | G06F 17/246 |
| 2007/0050697 | A1* | 3/2007 | Lewis-Bowen | G06F 17/246 |
| | | | | 715/212 |
| 2007/0260492 | A1* | 11/2007 | Feied | G16H 10/60 |
| | | | | 705/3 |
| 2009/0276692 | A1* | 11/2009 | Rosner | G06F 17/245 |
| | | | | 715/227 |
| 2010/0169758 | A1* | 7/2010 | Thomsen | G06F 17/246 |
| | | | | 715/212 |
| 2011/0252300 | A1* | 10/2011 | Lloyd | G06F 17/246 |
| | | | | 715/217 |
| 2014/0189482 | A1* | 7/2014 | Hill | G06F 3/04883 |
| | | | | 715/212 |
| 2014/0372851 | A1* | 12/2014 | Rutherford | G06F 17/246 |
| | | | | 715/212 |
| 2015/0356061 | A1* | 12/2015 | Rampson | G06F 17/241 |
| | | | | 715/230 |
| 2016/0378811 | A1* | 12/2016 | Kapoor | G06F 16/245 |
| | | | | 707/741 |
| 2017/0124142 | A1* | 5/2017 | Becker | G06F 16/2365 |
| 2018/0157467 | A1* | 6/2018 | Stachura | G06F 8/30 |
| 2019/0138658 | A1* | 5/2019 | Mathur | G06F 16/9017 |
| 2019/0258709 | A1* | 8/2019 | Campbell | G06F 3/04817 |

\* cited by examiner

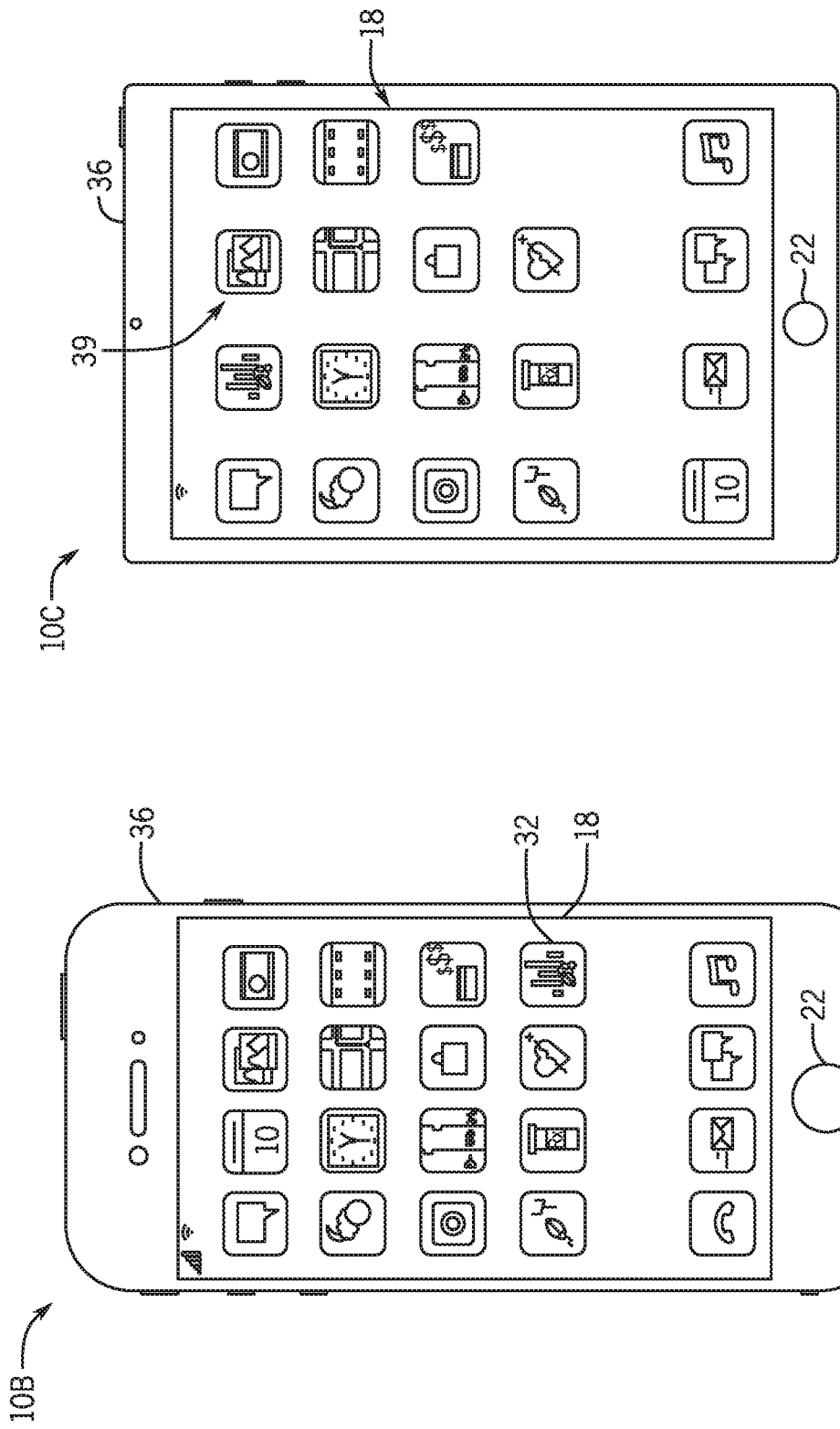

| | A | B | C | D | E |
|---|---|---|---|---|---|
| 1 | ANIMAL | FARM # | ANIMAL COUNT | # SICK IN LAST YEAR | % OF TOTAL/FARM |
| 2 | COW | 1 | 1000 | 100 | 31.3% |
| 3 | COW | 2 | 1200 | 12 | =ANIMAL COUNT + SUM(C$2:C$4) |
| 4 | COW | 3 | 1000 | 100 | 81.0% |
| 5 | GOAT | 1 | 400 | 40 | 14.8% |
| 6 | GOAT | 2 | 300 | 30 | 11.1% |
| 7 | GOAT | 3 | 2000 | 200 | 74.1% |
| 8 | HORSE | 1 | 50 | 5 | 27.8% |
| 9 | HORSE | 3 | 100 | 10 | 55.6% |
| 10 | HORSE | 3 | 10 | 1 | 5.6% |
| 11 | HORSE | 4 | 20 | 2 | 11.1% |
| 12 | SHEEP | 1 | 1500 | 150 | 75.0% |
| 13 | SHEEP | 2 | 500 | 50 | 25.0% |

| | A | B | C | D | E |
|---|---|---|---|---|---|
| 1 | ANIMAL | FARM # | ANIMAL COUNT | # SICK IN LAST YEAR | % OF TOTAL / FARM |
| | FARM #: | | 108 | | |
| | ▽ 1 | | | 100 | 68.9% |
| 2 | COW | 1 | 1000 | | |
| 3 | GOAT | 1 | 400 | 5 | 27.8% |
| 4 | HORSE | 1 | 50 | | |
| 5 | SHEEP | 1 | 1500 | 150 | 75.0% |
| | ▽ 2 | | | | |
| 6 | COW | 2 | 1200 | 120 | 37.5% |
| 7 | GOAT | 2 | 300 | 30 | 11.1% |
| 8 | SHEEP | 2 | 500 | 50 | 25.0% |
| | ▽ 3 | | | | |
| 9 | COW | 3 | 1000 | 100 | 31.3% |
| 10 | GOAT | 3 | 2000 | 200 | 74.1% |
| 11 | HORSE | 3 | 100 | 10 | 55.6% |
| 12 | HORSE | 3 | 10 | 1 | 5.6% |
| | ▽ 4 | | | | |
| 13 | HORSE | 4 | 20 | 2 | 11.1% |

Formula bar: fx = SUM(C$2:C$4) + ANIMAL_COUNT

FIG. 9A

|   | A | B | C | D | E |
|---|---|---|---|---|---|
| 1 | ANIMAL | FARM # | ANIMAL COUNT | # SICK IN LAST YEAR | % OF TOTAL / FARM |
|   | FARM #: |   | 108 |   |   |
|   | ▽ 1 |   |   |   |   |
| 2 | COW | 1 | 1000 |   | 31.3% |
| 3 | GOAT | 1 | 400 | 100 | fx =SUM(C$2:C$6)/C$9 |
| 4 | HORSE | 1 | 50 | 5 | 27.8% |
| 5 | SHEEP | 1 | 1500 | 150 | 75.0% |
|   | ▽ 2 |   |   |   |   |
| 6 | COW | 2 | 1200 | 108 | 37.5% |
| 7 | GOAT | 2 | 300 | 120 | 11.1% |
| 8 | SHEEP | 2 | 500 | 30 | 25.0 |
|   | ▽ 3 |   |   | 50 |   |
| 9 | COW | 3 | 1000 | 108 | 31.3% |
| 10 | GOAT | 3 | 2000 | 100 | 74.1% |
| 11 | HORSE | 3 | 100 | 200 | 55.6% |
| 12 | HORSE | 3 | 10 | 10 | 5.6% |
|   | ▽ 4 |   |   | 1 |   |
| 13 | HORSE | 4 | 20 | 2 | 11.1% |

| | A<br>(UID:C1) | B<br>(UID:C2) | C<br>(UID:C3) | D<br>(UID:C4) | E<br>(UID:C5) |
|---|---|---|---|---|---|
| FARM #: | ANIMAL | FARM # | ANIMAL COUNT | # SICK IN LAST YEAR | % OF TOTAL/FARM |
| ▽ 1 (UID:R1) | COW | 1 | ⊕ | 100 | 31.3% |
| (UID:R4) | GOAT | 1 | 1 | fx 5 | |
| (UID:R7) | HORSE | 1 | 1500 | 165 150 | 27.8% |
| (UID:R11) | SHEEP | 1 | | | 75.0% |
| ▽ 2 (UID:R2) | COW | 2 | ⊕ 1200 | 120 | 37.5% |
| (UID:R5) | GOAT | 2 | 300 | 30 | 11.1% |
| (UID:R12) | SHEEP | 2 | 500 | 50 | 25.0 |
| ▽ 3 (UID:R3) | COW | 3 | ⊕ 1000 | 100 | 31.3% |
| (UID:R6) | GOAT | 3 | 2000 | 200 | 74.1% |
| (UID:R8) | HORSE | 3 | 100 | 10 | 55.6% |
| (UID:R9) | HORSE | 3 | 10 | 1 | 5.6% |
| ▽ 4 (UID:R10) | HORSE | 4 | 20 | 2 | 11.1% |

SUBTOTAL / AVERAGE / MEDIAN / RANGE

SUM▼ (C32:C36:C39 ▼) ⊗ ⊙
ANIMAL COUNT ▼ +

RANGE: (R1,C3) & (R2,C3) & (R3,C3)

FIG. 12

| | A | B | C | D | E | F |
|---|---|---|---|---|---|---|
| FARM #: | ANIMAL | FARM # | ANIMAL COUNT | # SICK IN LAST YEAR | % OF TOTAL / FARM | BALES OF FEED |
| ▽ 1 | | | SUBTOTAL: 2950 | | | |
| | COW | 1 | 1000 | 100 | 33.9% | 100000 |
| | GOAT | 1 | 400 | 40 | 2.6% | 4000 |
| | HORSE | 1 | fx =ANIMAL COUNT + ANIMAL COUNT (SUBTOTAL) | | | 2500 |
| | SHEEP | 1 | 1500 | 150 | 50.8% | 45000 |
| ▽ 2 | COW | 2 | 1200 | 120 | 60.0% | 120000 |
| | GOAT | 2 | 300 | 30 | 15.0% | 3000 |
| | SHEEP | 2 | 500 | 50 | 25.0% | 15000 |
| ▽ 3 | COW | 3 | 1000 | 100 | 32.2% | 100000 |
| | GOAT | 3 | 2000 | 200 | 64.3% | 20000 |
| | HORSE | 3 | 100 | 10 | 3.2% | 5000 |
| | HORSE | 3 | 10 | 1 | 0.3% | 500 |
| ▽ 4 | HORSE | 4 | 20 | 2 | 100.0% | 1000 |

FIG. 13

EXPLODED-RANGE REFERENCES

BACKGROUND

The present disclosure relates generally to techniques for utilizing exploded cell range references. Exploded cell range references, as used herein, refer to references to a range of cells that are noncontiguous.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of applications, including spreadsheet applications, presentation applications, and word processing applications, may allow a user to generate and display data in the form of tables that includes rows and columns of cells. For example, a user may generate a table using a spreadsheet application in order to track or analyze a set of quantitative or qualitative data. Often an application may allow a user to define a formula within a cell that references other cells within a spreadsheet or table. For example, a formula entered into a cell of a table may reference other cells of that table or of other generated tables for values that are used, evaluated, or manipulated by the formula in question. For example, one cell may contain a formula for adding or otherwise mathematically manipulating a set of values that are defined in other cells or a range of cells of a table in a spreadsheet.

One consequence of such cell referencing is that a change to the respective table containing the referenced cells may have an inadvertent impact on a referencing formula. Changes affecting the layout or arrangement of an array of cells, such as by categorizing or grouping the cell data based on data commonalities, may result in formulas no longer referencing the cells intended by the user. When a table is updated or organized, such as by grouping or categorizing, the update may lead to a reorganization of cells or even additional rows and columns. For example, selected range of contiguous cells may no longer be contiguous when rearranged by a grouping organization. Unfortunately, changes to the given range of cells may inadvertently render one or more formulas incorrect by no longer referencing the cells originally specified in the formula.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein are related to facilitating the use of noncontiguous cell ranges in formulas. For example, upon updating of spreadsheet table cells and formulas that may reference a contiguous range of cells prior to any rearrangement or reorganization, the formulas of organized tables that may be generated based on a previous table and its cells, such as a base table prior to any organization of table data. The formula may be updated in response to the change or organization made. The organized table view may cause additional rows and/or columns to be generated or rearrange rows and/or column, which may cause a formula of the organized table referencing a range of cells in the base table to become noncontiguous or exploded. In one such example, cells of the base table range may be tracked. In such embodiments, the cells may be tracked from the base table to the generated organized table via a coordinate system. In another embodiment, the cells may be tracked from the base table to the organized table via an index that may index the cell of the original table to a direct mapping of an indexed cell in the organized table.

In another embodiment, a summary reference cell may be provided in the organized table, such that the summary reference cell may refer to a sub-group computation for a range grouped cells in the organized table. In other words, the summary reference cell may be a specially designated cell used to automatically refer to a sub-group or range associated with the specially designated cell.

BRIEF DESCRIPTION OF THE DRAWINGS

Various aspects of this disclosure may be better understood upon reading the following detailed description and upon reference to the drawings in which:

FIG. 3 is a front view of a handheld device representing another embodiment of the electronic device of FIG. 1, in accordance with an embodiment of the present disclosure;

FIG. 4 is a front view of a hand-held tablet device representing another embodiment of the electronic device of FIG. 1 in accordance with an embodiment of the present disclosure;

FIG. 7 is a block diagram of a spreadsheet application with a base table, in accordance with an embodiment of the present disclosure;

FIG. 8 is a block diagram of an organization option button for grouping data of the base table based on a commonality, in accordance with an embodiment of the present disclosure;

FIG. 9A is a block diagram of an organized table view with a formula referencing cells of a base table without using track references, in accordance with an embodiment of the present disclosure;

FIG. 9B is a block diagram of an organized table formula referencing cells of a base table using track references, in accordance with an embodiment of the present disclosure;

FIG. 10 is a block diagram of the base table and organized table utilizing a coordinate system for track references, in accordance with an embodiment of the present disclosure;

FIG. 12 is a block diagram of the organized table with summary a summary reference cell with summary options, in accordance with an embodiment of the present disclosure;

FIG. 13 is a block diagram of an organized table view, where a formula of the organized table view references the summary reference cell of FIG. 12, in accordance with an embodiment of the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. In some embodiments, it should be understood that references to "one embodiment" or "an embodiment" of the present disclosure are not intended to be interpreted as excluding the existence of additional embodiments that also incorporate the recited features.

The present disclosure is generally directed to resolving issues that may arise in formulas (such as formulas used to implement one or more defined functions) that may reference a range of cells that may have been involved in a rearrangement operation, such that the original cells may have been transposed to a new location on a table. The operation may occur on a range of cells when a user groups data of a base table based on a commonality to create a new view of the table, such as an organized table view. For example, a formula reference may include a range of contiguous cells of the base table that may be transposed and become a noncontiguous, exploded range in the organized table.

As discussed herein, in certain implementations, certain parts of the formulas may be updated or rewritten to reflect the new position or arrangement of the organized referenced range of cells by tracking the group of cells used in the formula prior to the update. Further in certain embodiments, a summary cell may be generated above a given row or column for a group of cells and may be referenced as a single cell for the same group of cells in another cell formula, regardless of further rearrangements that may occur due to grouping operations. The update of cell location in formula references and/or the summary reference may be performed algorithmically based in part on the generation of the organized table based on the base table.

Figure 1:
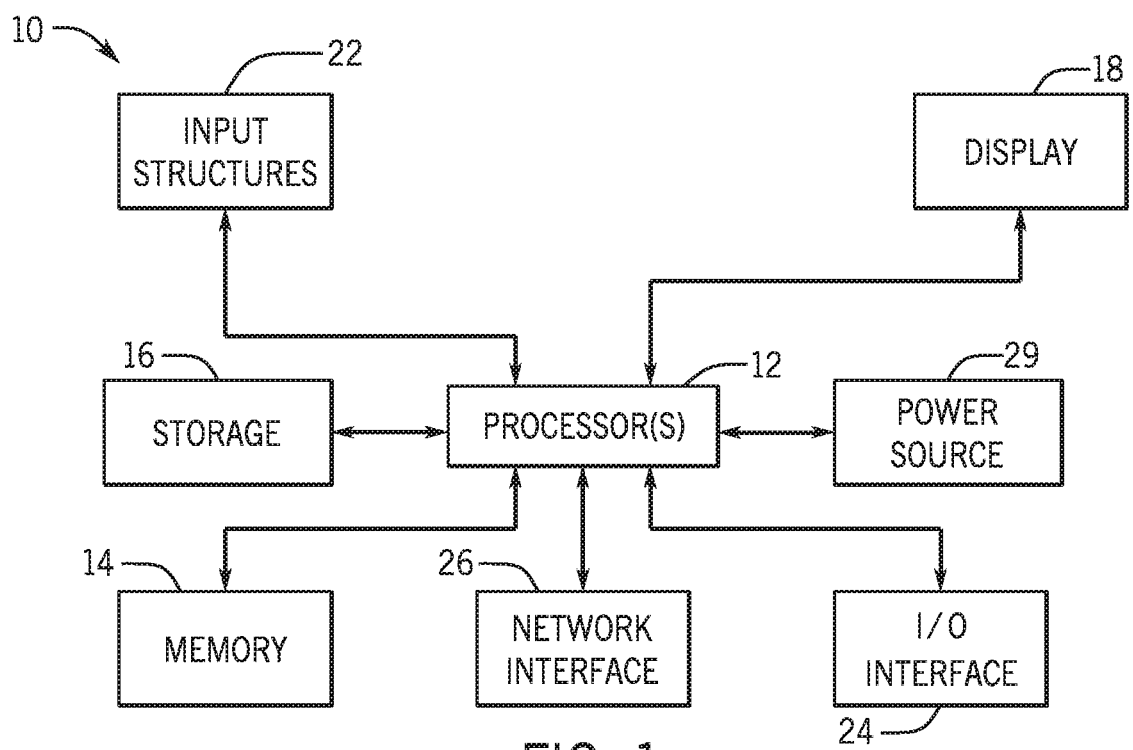
FIG. 1 is a block diagram of an electronic device that may benefit from exploded cell references, in accordance with an embodiment of the present disclosure.

With the foregoing in mind, a general description of a variety of suitable electronic devices may employ the techniques described herein to provide exploded cell range references and/or provide a summary reference cell for a range of grouped cells. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10.

Figure 2:
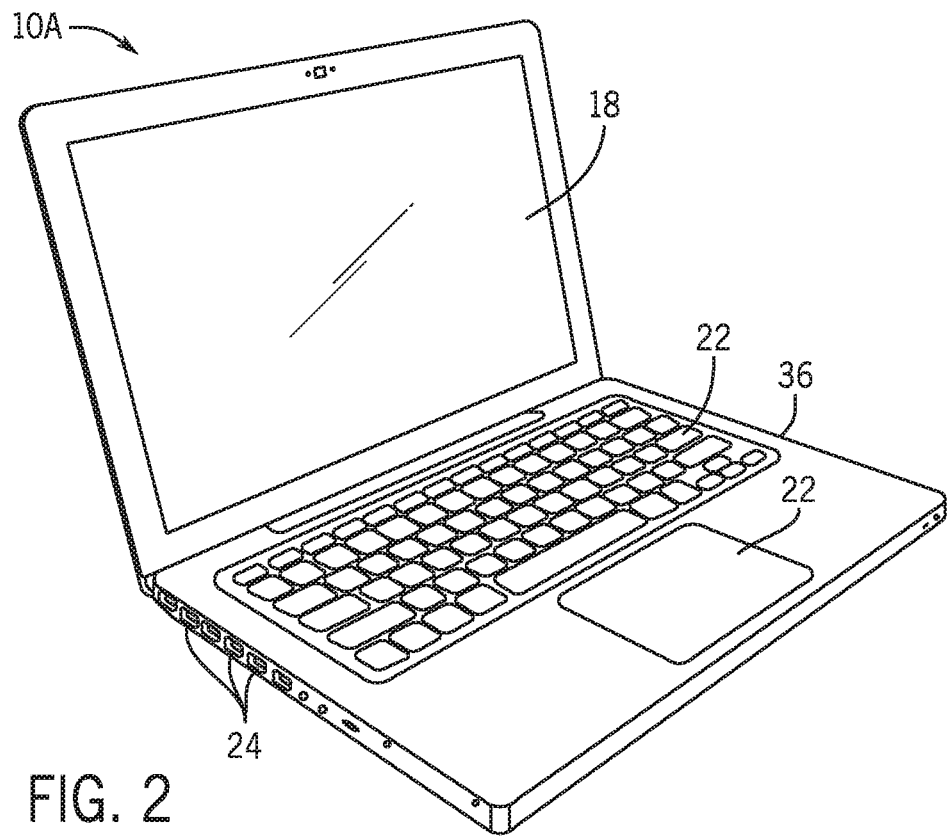
FIG. 2 is a perspective view of a notebook computer representing an embodiment of the electronic device of FIG. 1, in accordance with an embodiment of the present disclosure.
Figure 5:
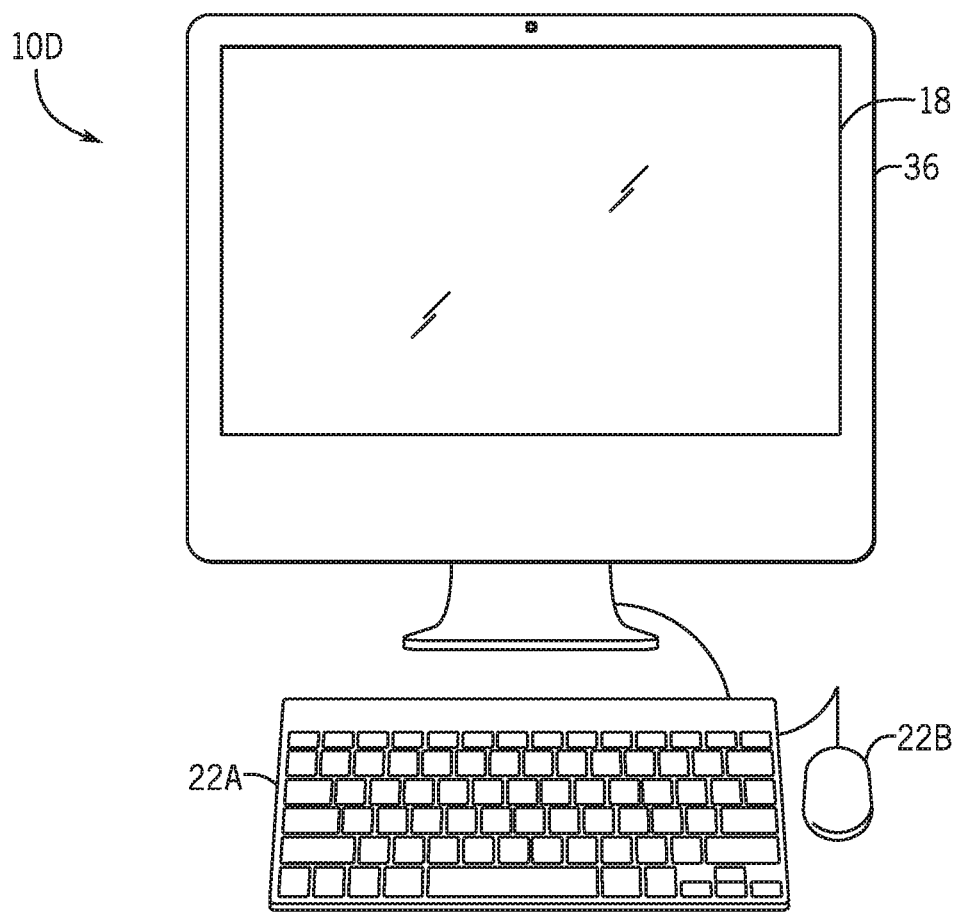
FIG. 5 is a front view of a desktop computer representing another embodiment of the electronic device of FIG. 1, in accordance with an embodiment of the present disclosure.
Figure 6:
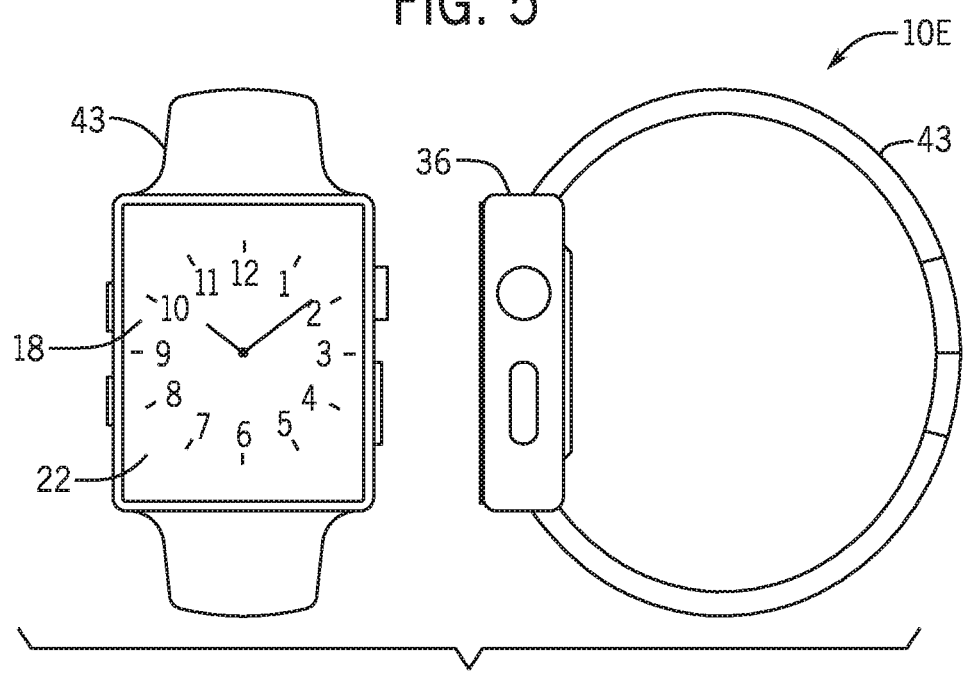
FIG. 6 is a front view and side view of a wearable electronic device representing another embodiment of the electronic device of FIG. 1, in accordance with an embodiment of the present disclosure.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as machine-readable instructions (e.g., software or firmware), hardware, or any combination thereof. Furthermore, the data processing circuitry may be separate components, components of a single contained processing module (e.g., a system-on-a-chip device), or may be incorporated wholly or partially within any of the other elements within the electronic device 10.

In the electronic device 10 of FIG. 1, the display 18 may be any suitable electronic display used to display image data (e.g., a liquid crystal display (LCD) or an organic light emitting diode (OLED) display). In some examples, the display 18 may represent one of the input structures 22, enabling users to interact with a user interface of the electronic device 10. In some embodiments, the electronic display 18 may be a MultiTouch™ display that can detect multiple touches at once. Other input structures 22 of the electronic device 10 may include buttons, keyboards, mice, trackpads, and the like. The I/O interface 24 may enable electronic device 10 to interface with various other electronic devices (e.g., pressing a button to increase or decrease a volume level), as may the network interface 26.

The network interface 26 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB☐H), ultra-Wideband (UWB), alternating current (AC) power lines, and so forth.

The processor(s) 12 and/or other data processing circuitry may execute instructions and/or operate on data stored in the memory 14 and/or nonvolatile storage 16. In some embodiments, the processor(s) 12 of the electronic device 10 of FIG. 1 may be operably coupled with the memory 14 and the nonvolatile storage 16 to facilitate the use of the processors(s) 12 to implement various stored algorithms. As discussed herein, the algorithms may include algorithms to control tracking of a range of cell references of tables on a spreadsheet that may be rearranged when organized, such as by grouping based on a commonality, or an algorithm to generate a summary reference for a subset of grouped data. Such programs or instructions executed by the processor(s) 12 may be stored in any suitable article of manufacture that includes one or more tangible, computer-readable media at least collectively storing the instructions or routines, such as the memory 14 and the nonvolatile storage 16. In another embodiment, the processor(s) 12 may receive an indication of a user-selected category for grouping cells from, for example, by the input structures 22. The processor(s) 12 may select the categorization or update cell arrangement based upon this indication.

The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities. By way of example, a computer program product containing the instructions may include an operating system (e.g., OS X® or iOS by Apple Inc.) or an application program (e.g., Numbers®, Pages®, or Keynote® by Apple Inc.) or a suite of such application programs (e.g., iWork® by Apple Inc.).

As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface (e.g., spreadsheet) displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif.

The handheld device 10B may include an enclosure 36 to protect interior components from physical damage and to shield them from electromagnetic interference. The enclosure 36 may surround the display 18, which may display a graphical user interface (GUI) having an array of icons 32. By way of example, one of the icons 32 may launch a spreadsheet application program (e.g., Numbers® by Apple Inc.). User input structures 22, in combination with the display 18, may allow a user to control the handheld device 10B. For example, the input structures 22 may activate or deactivate the handheld device 10B, navigate a user interface to a home screen, navigate a user interface to a user-configurable application screen, activate a voice-recognition feature, provide volume control, and toggle between vibrate and ring modes. Touchscreen features of the display 18 of the handheld device 10B may provide a simplified approach to controlling the spreadsheet application program. The handheld device 10B may include I/O interface 24 that opens through the enclosure 36. The I/O interface 24 may include, for example, an audio jack and/or a Lightning® port from Apple Inc. to connect to external devices, such as speakers and/or headphones.

FIG. 4 depicts a front view of a handheld tablet device 10C, which represents another embodiment of the electronic device 10. The handheld tablet device 10C may represent, for example, a tablet computer, or one of various portable computing devices. By way of example, the handheld tablet device 10C may be a tablet-sized embodiment of the electronic device 10, which may be, for example, a model of an iPad® available from Apple Inc. of Cupertino, Calif. The handheld tablet device 10C may also include an enclosure 36 that holds the electronic display 18. Input structures 22 may include, for example, a hardware or virtual home button.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D. In one embodiment, the input structures 22 (e.g., a keyboard and/or touchpad) may be used to interact with the computer 10D, such as to start, control, or operate a GUI or applications (e.g., Numbers® by Apple Inc.) running on the computer 10D.

Similarly, FIG. 6 depicts a wearable electronic device 10E representing another embodiment of the electronic device 10 of FIG. 1 that may be operate using the techniques described herein. By way of example, the wearable electronic device 10E, which may include a wristband 43, may be an Apple Watch® by Apple Inc. More generally, the wearable electronic device 10E may be any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E Electronic devices 10A, 10B, 10C, 10D, and 10E described above may all track and update a range of cells referenced in a formula of a base table into a corresponding range of an organized table view that may be noncontiguous or exploded (e.g., due to the cells being reorganized in the organized table view, such as by grouping). In some embodiments, a summary cell may be generated within an organized table view, which provides mathematical values (e.g., sum, average, mean, etc. for a subset cell range) associated with an associated range of cells. The summary cell may be referenced and used in formulas, simplifying formula range selection. The summary cell reference may be referenced as a single cell in a formula and maintain references to the grouped range of cells regardless of any further rearrangements of cells that may occur due to additional organization, such as by additional grouping.

With the preceding in mind, a variety of computer program products, such as applications and/or operating systems executing on an electronic device 10, may use or implement the techniques discussed below to enhance the user experience on the electronic device 10. While the following examples are provided in the context of a spreadsheet application, the present approaches are suitable for use in other applications (e.g., word processing applications, presentation applications, address book or contact list applications, media storing or playback applications, and so forth) where tables of data may be created, displayed, and updated.

For example, an electronic device 10 may store and run a spreadsheet application (e.g., Numbers® from Apple Inc.) or other suitable application configured to implement the present tracking cell range references and updating approaches. The application may be stored as one or more executable routines (which may encode and implement the actions described below) in memory and/or storage of FIG. 1. These routines, when executed, may cause the electronic device 10 to render tables and organized views in accordance with the techniques described herein.

Turning now to a more detailed discussion of a range of cells referenced by a formula of another cell that may benefit from tracking for reorganization of data, FIG. 7 illustrates a block diagram depicting spreadsheet application, which includes a base table 100 having rows 102 and columns 104 of cells 106. Upon selecting a cell 106 within the base table 100, a user may be provided a prompt or other entry box by which text, numbers, formulas 110, and so forth may be entered in a formula bar 111 as the contents of a cell 106 or by which the existing contents of a cell 106 may be edited or modified. A user may select a range 108 of contiguous cells 106, creating a box like structure 107 around cells 106 to track. In the depicted example, the base table 100 is populated by a set of data related to farms, though examples of other suitable data may include financial or business data, sports data, demographic data, medical data, or any other type of data. In this example, the base table 100 includes a header row 114 that lists various field headings (e.g., commonalities for sets of cells 106, such as rows 102 and/or columns 104 of cells 106). Here, the field headings denote "Animal," "Farm #," "Animal Count," "# sick in last year," and "% of total/farm" for the respective columns 104. As depicted, and in one embodiment, a user may select a cell 106, such as E2 in the depicted example, and set the formula 110 for the selected cell. The formula 110 may reference other cells in the base table 100. Examples of such formulas may include mathematical formulas (such as formulas to determine a sum, difference over a range of cells) and/or statistical formulas (such as formulas to determine an average, median, maximum, minimum, or mode, over a range of cells). Similarly, such formulas may also include formulas related to the layout, searching, referencing, or redirection of the contents of a cell for various display or calculation purposes. In the provided example, the formula 110 for cell E2 is set to calculate a percentage of a total number of animals of a particular type that the current Animal Count (e.g., column C of the current row) represents, as indicated by the "% of total/farm" header. Accordingly, the formula 110 references the SUM of range 108 (C$2:C$4), where the "$" indicates that the formula reference is fixed, which is divided by the current Animal Count (e.g., column C of the current row). Thus, the calculated value of 31.3% of E2 may indicate a percentage calculated by: 1000 animal count cows on Farm 1 divided by the SUM of all animal counts for the selected contiguous range (e.g., the cows on farms 1-3).

The spreadsheet may include an organization interface bar above the base table 100 of the spreadsheet that may include buttons, menus, drop down boxes, and so forth that a user may use to interact to invoke various functions within the spreadsheet application. In some embodiments, the rows 102 and/or columns 104 may be enabled to filter or group their respective values numerically, alphabetically, or grouped based on a commonality. By way of example, in the depicted spreadsheet, an organization button 112 is provided. By selecting the organization button 112, a new organized table view is generated and rendered data of the base table 100. A table view may be a rendered graphical view of base data that does not alter the underlying base table 100, but instead references the base table in a separate graphical rendering. In this manner, whenever the original table or base table 100 is reorganized, such as by further grouping or categorization, the base table 100 may be preserved in the original spreadsheet. The base table 100 may remain unchanged in the original spreadsheet view while the organized table is generated in a separate view, such as in a new spreadsheet. In some embodiments, only the second view or organized table may be viewable to the user while the base table 100 view is hidden and stored in the system. Although the descriptions provided herein describe an organized table 130 as a separate view, it should be noted that any suitable number of views may be generated to perform the operations herein. For example, in some embodiments, the organization may cause the actual cells in the base table 100 to be reorganized. In some embodiments, the base table 100 may be hidden upon the generation of the organized table and/or additional table views may be generated based on additional groupings.

Figure 8:
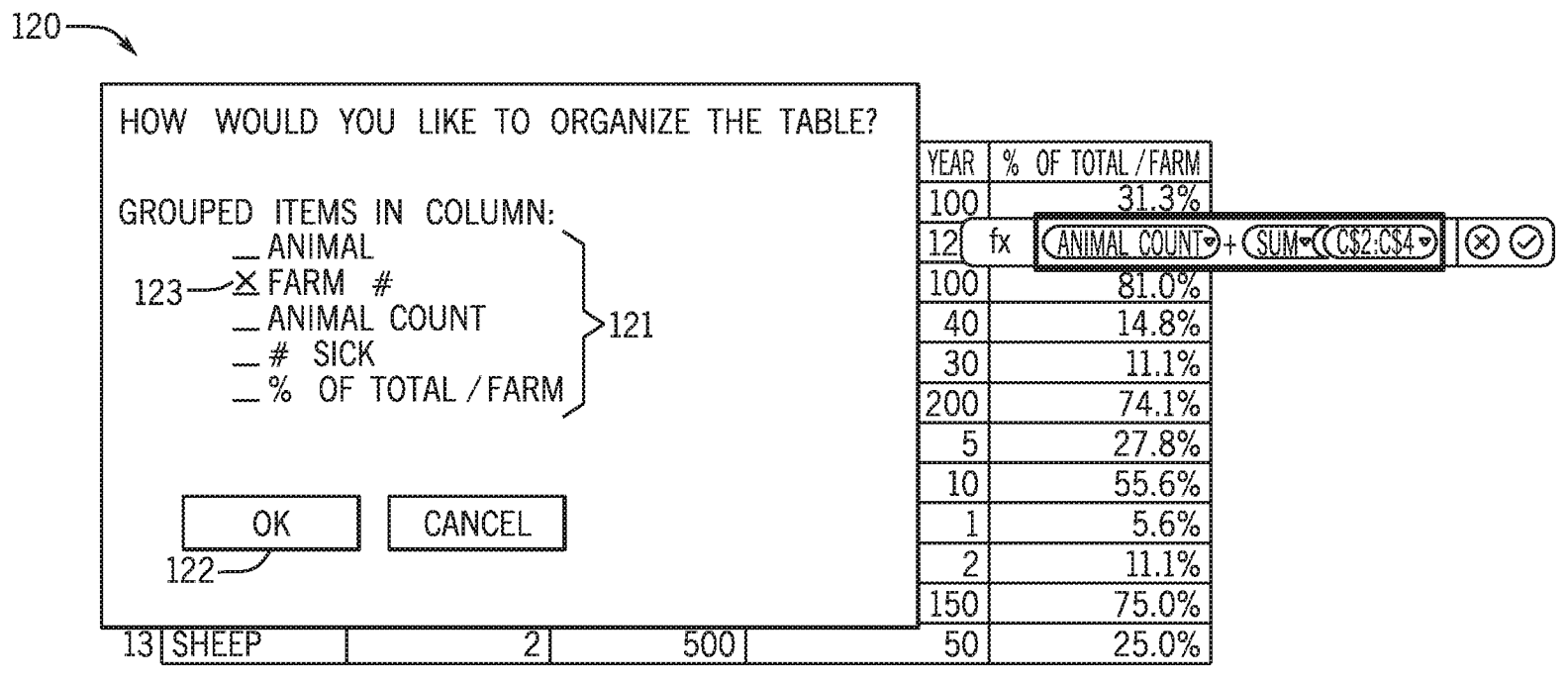

To illustrate a reorganization option by grouping data of the base table 100, FIG. 8 depicts an organization prompt 120 upon the selection of the organization button 112 of FIG. 7. The organization options may be based on the header row 114, header columns 115, rows 102, or columns 104 values. For example, the application, when generating the organization prompt 120, may generate selectable group by options 121 to render within the organization prompt 120 based on the header row 114 labels in base table 100, such as "Animal," "Farm #," "Animal Count," "# Sick," or "% of total/farm." As depicted, the user may select (such as by using a mouse, touch screen, or other suitable input mechanism) one or more of the selectable group by options 121. In the current example, the user selected the "Farm #" option 123 and then selected the "OK" 122 button to confirm that that the base table 100 should be organized based on "Farm #." The application then executes a reorganization of the base table 100 data and/or generates an organized table view based upon the selected options of the selectable group by options 121.

FIG. 9A depicts an example of an organized table/table view 130 that may be generated based on the Farm # selected option 123 made in FIG. 8. As depicted, the organized table/table view 130 may differ from the base table 100 in that the rows 102 and columns 104 may be sorted in a different order in the organized table/table view 130, and may also include additional rows 102 and/or columns 104 (e.g., rows 132 in FIG. 9A). As may be appreciated, the reorganization may cause the original range 108 of selected cells 106 used in formula 110 to become invalid and in need of change. Continuing with the example of the user selected cell E2, the formula 110 used to calculate "% of total/farm" was set to C2/(SUM:C$2-C$4) in the base table 100, such that the C$2-C$4 values included 1000, 1200, and 1000, respectively. However, in the organized table/table view 130, the data may be organized by "Farm #," such that all animals belonging to a specific farm are grouped together, and the formula 110 may not have been updated to reflect the change in range 108 from the base table 100 to the organized table/table view 130. Indeed, the cell values of C$2-C$4 have changed to 1000, 400, and 50, respectively. Thus, cell E2 that depicts a value of 68.9% incorrectly continues to reference C2/(SUM:C2-C4) in its formula 110.

However, as depicted in the organized table/table view 130 of FIG. 9B, the application may account for formula argument changes necessitated by reorganizing the base table 100 data, even using exploded range (e.g., noncontiguous ranges) when the formerly used ranges are no longer contiguous. In the current example, formula 110 should update to reference cells C2, C6, C9 to properly reference the correct cells 106 being used to calculate the 31.3% value of cell E2. Therefore, the organized table/table view 130 may benefit from reference tracking techniques to correctly update referenced cells in the formula 110 of any cell 106 when the data has been categorized or reorganized, such as by grouping based on a commonality. For example, in some embodiments, as illustrated in FIG. 9B, the converted range may be a non-contiguous range of cells (e.g., C2, C6, and C9) aggregated by use of a special character/function (e.g., a pipe "|" with an associated function) that enables the application to aggregate cells joined by the special character.

Figure 10:
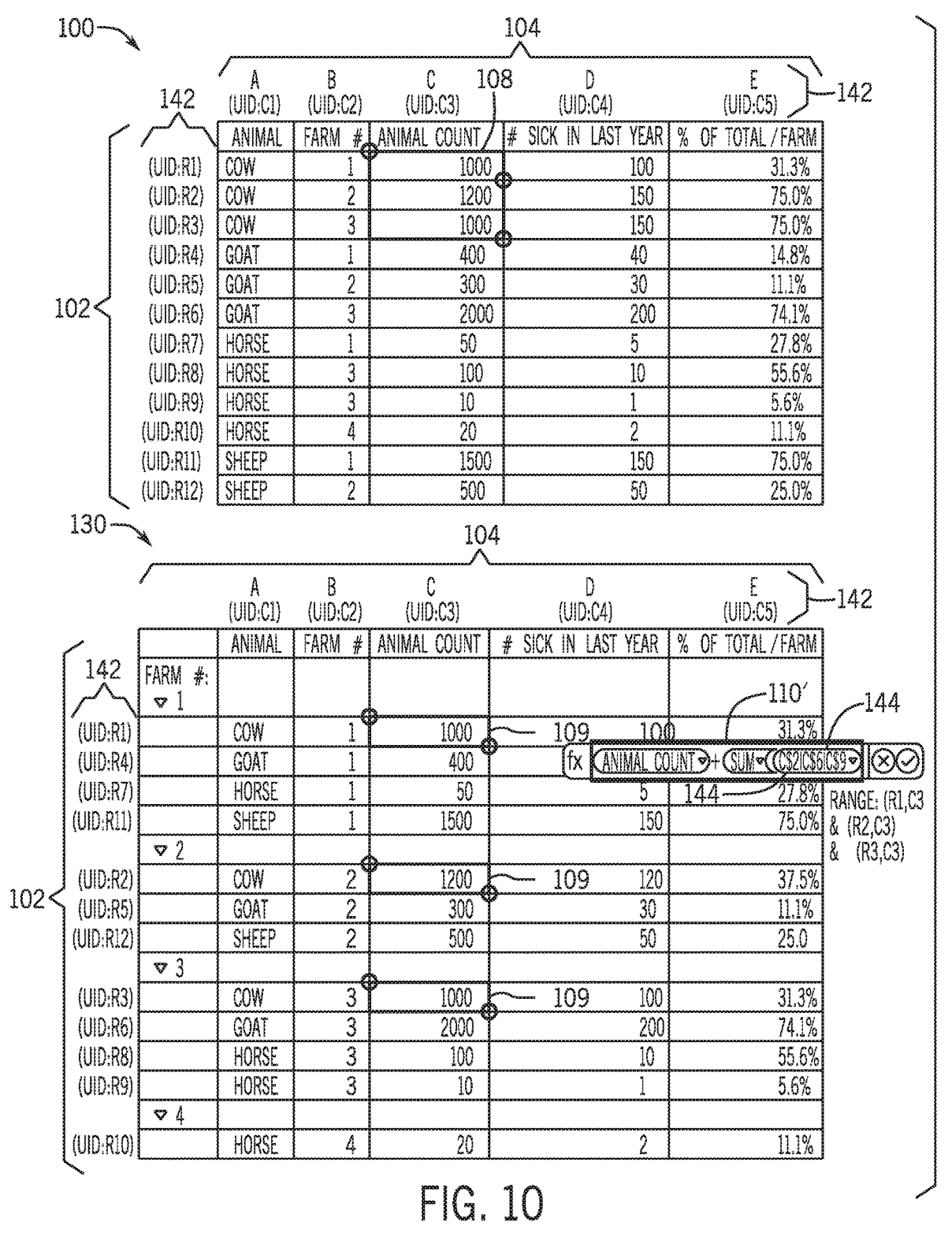

Turning to a more detailed discussion of how the ranges used in the base table 100 are tracked and converted in the organized table/table view 130, FIG. 10 depicts the base table 100 and the organized table/table view 130 tracking and updating the range 108 by using unique identification (ID) for rows 102, columns 104, and/or cells 106. In some embodiments, each cell 106 of the base table 100 and the organized table/table view 130 may be identified via a coordinate system. The coordinate system may include a unique ID 142 to represent a column 104 and row 102 intersection pertaining to a given cell 106. For example, the selected range 108 may include cells with a cross intersection of unique IDs including: (UID: R1,C3), (UID: R2,C3), and (UID: R3,C3). Thus, each cell 106 of base table 100 may have both a row 102 and a column 104 intersection unique ID 142 to represent the cell 106. In some embodiments, each cell 106 of the base table 100 may be identified by a cell unique identifier without regard to row 102 or column 104 unique identifiers. In such embodiments, additional overhead may be incurred by having unique identifiers at the cell 106 level, but may reduce processing time by not needing to process row 102 and column 104 intersections to obtain a cell 106 unique identifier. For simplicity, the discussion will refer to an example embodiment using row 102 and column 104 unique identifier intersections to determine cell 106 unique identifiers. However, this is not intended to limit the scope to such embodiments.

The unique IDs 142 may be beneficial for tracking purposes, especially for an exploded track range, such that the range 108 of selected cells 106 from the base table 100 may be converted to "exploded" or noncontiguous ranges when the organized table/table view 130 is generated. Thus, the unique IDs 142 may be used to maintain and track cells 106 of the base table 100 as corresponding to particular cells 106 of the organized table/table views 130 upon the generation of the organized table/table views 130.

In another embodiment, a cell 106 of the base table 100 may use cell indexes or lookup tables, which may be stored in memory 14. The table indexes may include data pertaining to each cell 106 in the base table 100 and its direct mapping to a new location upon the generation of the organized table/table view 130.

Since the selected contiguous or boxed range 108 may no longer reference the correct cells and no longer be contiguous when generated in the organized table/table view 130, pipes 144 may be used to combine noncontagious cells 106 of the organized table range 109. The pipes 144 may be used to generate a compatible noncontiguous organized table range 109 for the formula 110' that is equivalent to range 108 in formula 110 of the base table 100.

For example, the pipes 144 may provide an indication of noncontiguousness between ranges of cells in a formula 110. In some embodiments, cell references to the organized table/table view may be rendered in the formula, while the underlying processing is performed using the unique IDs 142 pertaining to the organized table range 109. As depicted, the pipes 144 may result in a noncontiguous organized table range 109 (e.g., C2, C6, and C9) translated from a range (e.g., C2-C4) of the base table 100. This may be done by using unique IDs 142 to track the cells between the base table 100 and the organized table/table view 130. The pipes 144 are used to accumulate noncontiguous cells in the translated noncontiguous organized table range 109.

In the illustrated embodiment, the pipes 144 in formula 110 use the "|" symbol to indicate that the cell parameters belong to a noncontiguous organized table range 109, and the "$" to indicate that the cells are fixed. Thus, as shown in the current embodiment, the formula 110 that may use the SUM of "C$2|C$6|C$9" may indicate that cells 106 C2, C6, and C9 are fixed references in the formula (e.g., as indicated by the "$" in each cell reference), and that the cells 106 may be accumulated together to be read as a single noncontiguous organized table range 109 (e.g., as indicated by the "|" between the cell references).

Figure 11:
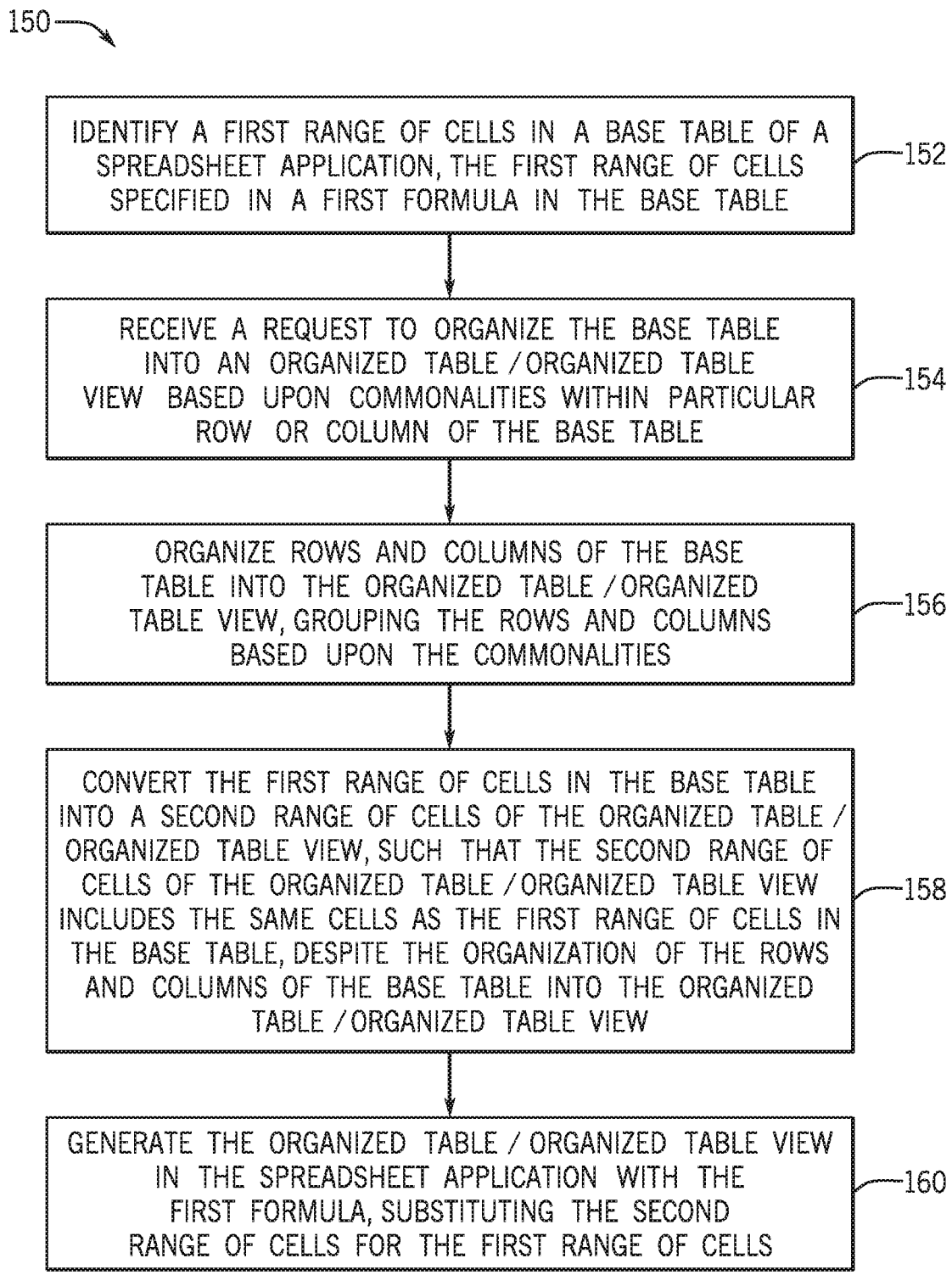
FIG. 11 is a process flow diagram, illustrating a process for updating formula cell references using track references, in accordance with an embodiment of the present disclosure.

With the preceding in mind, and to facilitate explanation, process flow diagram 150 in FIG. 11 illustrates transitioning to exploded ranges. In one embodiment, a base table may be initially present or displayed on an application (e.g., spreadsheet application). The process may include identifying (block 152) a first range of cells in a base table of a spreadsheet. The range may be specified in the formula for calculating a value for a given cell 106. Accordingly, the range may be identified based upon being specified in the formula.

Next, a request to organize the base table into an organized table based upon certain commonalities associated with rows and/or columns of the base table may be received (block 154). In some embodiments, the organization may be categories of data derived from headers of the rows and/or columns.

Upon receiving the organization request, the algorithm may organize (block 156) the rows and columns of the base table into the organized table, which may include grouping the rows and/or columns based on selected commonalities included in the request. As mentioned previously, generating the organized table may generate additional rows and/or columns with commonality header information (e.g., headers between sections (rows and/or columns) that are grouped by the selected commonalities).

Since the rows and/or columns may be shifted in the organization process, the originally selected range of cells used in the formula of a cell of the base table may no longer be in the same location in the organized table. Thus, the formula may be updated by tracking the cells of the original range, such that if the cells become rearranged and/or noncontiguous in the organized table or another view, the tracked cells automatically update to a new range by converting (block 158) the first range of cells in the base table into a second range of cells in the organized table, such that the second range of cells may include the same cells as the first range of cells in the base table, regardless of the organization of the rearranged or additional rows and/or columns of the base table into the organized table. The first range of cells may be converted to the second range of cells via the coordinate system and/or a stored index, as previously described in FIG. 10. In this manner, the range of cells may be tracked and aggregated together using pipes, creating a noncontiguous range to correctly indicate value and/or data of the tracked cells.

The tracked cells may be used to generate (block 160) the organized table in the spreadsheet application with the first formula (e.g., base table formula) and substituting the second range of cells for the first range of cells. The range substitution results in the proper range of cells being used in the generated table/table view.

Having discussed organized tables/table views, the discussion now turns to a more detailed discussion of grouping headers/cells that may enhance the organized tables/table views. The organized table/table view 130 may benefit from summary headers 161 and/or summary header cells 162 that may indicate additional data, such as a summary of a cells 106 pertaining to a particular grouping of the organized table/table view 130, as illustrated in FIG. 12.

As illustrated in FIG. 12, additional rows of summary headers 161 have been disposed between grouped data. The summary headers 161 include an indication of the commonality for the grouped data associated with the summary headers 161. For example, here, the rows are grouped based upon "Farm #."

A summary cell 162 may provide a summary of grouped data. As illustrated in the organized table/table view 130 of FIG. 12, the summary cell 162 may provide a mathematical summary for grouped cells. For example, based upon a selection of one or more summary reference options 163 (e.g., from a drop down menu that may include calculating a subtotal, average, median, or range, etc. of cells 106 of the organized table range 109), a mathematical operation for a range of associated commonality cells 165 may be implemented. For example, in the current embodiment, the user selects "subtotal" as the summary reference option 163, resulting in a subtotal of the commonality cells 165 being calculated and presented in the summary cell 162.

To detail this, block diagram of FIG. 13 depicts the organized table/table view 130 with a summary cell 162 indicating a subtotal value of 2950 as the summary reference value 170 for animals on Farm 1. The reference value may be automatically populated and may be used in other formulas 110 for cells 106. Thus, once the summary reference value 170 has been populated based on an organizational range, the summary cell 162 may be used as a reference to additional formulas. In this manner, as formulas 110 may be modified or new views may be generated, the summary reference value 170 may always refer to the same reference value 170 of the range of commonality cells 165. For example, as in the current embodiment, summary reference value 170 may refer to a user selected subtotal of range of commonality cells 165. Thus, the depicted summary reference value 170, may be used as a cell reference in formula 110 to refer to the subtotal of cells C2-05 (e.g., animal count in Farm 1 cells 106). In the current embodiment, the summary reference value 170 is referenced in the formula 110 by a special nomenclature that indicates the grouping (e.g., "1"), the column (e.g., "Animal Count"), and the summary reference option 163 (e.g., "Subtotal"). Though many nomenclature variations can be used, the current nomenclature uses [COLUMN]::[Grouping #]SUMMARY REFERENCE OPTION), thus resulting in ""$Animal Count::1 (Subtotal)."

Since the user has selected cell E2 in the current embodiment, the cell formula bar 111 for E2 may be visible, displaying the formula 110 used to calculate the value 33.9%. As shown, the formula 110 includes a first parameter 172, such as animal count, divided by a second parameter 174, the summary reference value 170. As depicted, the first parameter 172 may refer to a particular cell for the current row (e.g., the row the formula 110 is on), such as C2 having a value of 1000 in the animal count column 104. In this embodiment, the user has selected C2 for the value of the first parameter 172, but the value may be modified by expanding or moving the range selection nodes 176. By moving the range selection nodes 176 the first parameter 172 may refer to one or more cells 106. In some embodiments, the first parameter 172 may be modified to refer to a different category, such as the other column 104 headings including "Animal", "Farm #," "# Sick in last year," and "Bales of feed." Any changes to the first parameter 172, second parameter 174, and their selection nodes 176, may change the depicted value of the cell referencing those current parameters, such as E2. A user may use a drop down arrow 178 to switch to the different category of interest in the first parameter 172. Although the summary reference 170 cell is an automatically populated field, the second parameter 174 that may take into account the summary reference 170 may be modified.

In the current embodiment, the second parameter 174 value is a reference to the summary reference value 170, "$Animal Count::1 (Subtotal)." A first sub-parameter 180 of the second parameter 174 may include a "$" symbol, indicating any subsequent value or text is a fixed reference. In the current embodiment, the first sub-parameter 180 is "$Animal Count," which may indicate that the "Animal Count" is the summary column of interest and that it is a fixed value in the reference. As mentioned above, the "1" may indicate the grouping, such as Farm "1" under the first sub-parameter 180, "Animal Count." Lastly, an indication of the summary reference value 170 option is also provided, which is "subtotal" in the current embodiment. In some embodiments, this indication need not be present, instead relying on an indication in the summary cell 162 itself, rather than an explicit indication in the reference used by the formula 110.

The summary reference value 170 is a subtotal of 2950. This may indicate the total number of animal count under farm 1. Referring back to the user selection of E2, the formula 110 may indicate that the calculation of value of 33.9% may include the first parameter 172 divided by the second parameter 174, which is 1000 divided by 2950 and results in 33.9%.

As may be appreciated, the summary headers 161 and/or summary cells 162 may provide an additional level of detail regarding grouped data. This may greatly enhance user experience with organized table data. As these summary headers 161 and/or summary cells 162 are added and/or removed, the rows and/or columns of data may shift within the table/table view. Thus, formula ranges may be translated based upon shifting caused by the addition or removal of these summary headers 161 and/or summary cells 162, as described above.

Figure 14:
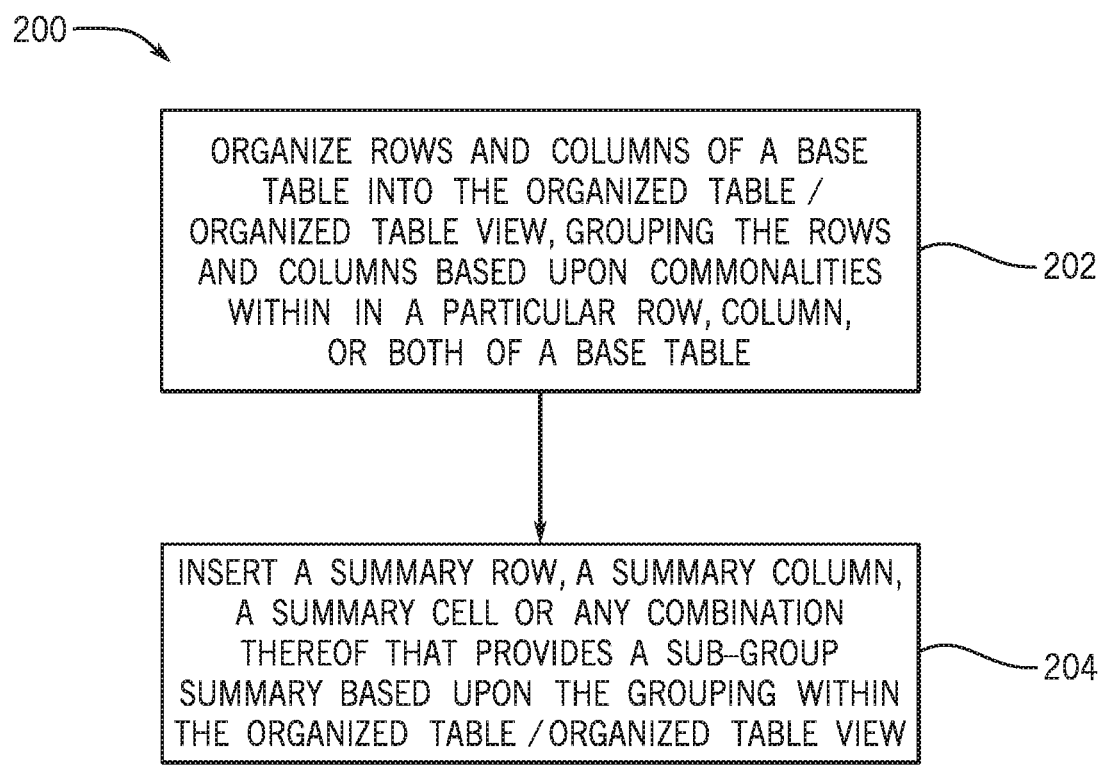
FIG. 14 is a process flow diagram, illustrating a process for using the summary reference cell, in accordance with an embodiment of the present disclosure.

With the preceding in mind, process flow diagram 200 in FIG. 14 illustrates the summary references that may implemented by an algorithm. In one embodiment, a base table may be initially present or displayed on an application (e.g., spreadsheet application). The process may include organizing (block 202) rows and columns of the base table into an organized table view, by grouping the rows and columns based upon commonalities within a particular row, column, or both (e.g., field headings of columns or rows, as described in FIG. 7) of the base table. The organization may be based upon categories of data discerned from headers of the spreadsheet.

Upon generation of the organized table, a summary header 161, such as a summary row and/or a summary column and/or a summary cell 162 may be inserted (block 204) based upon the grouping within the organized table/table view. For example, the summary header 161 and/or summary cell 162 may be inserted above a set of grouped data and refer to the grouped data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions that, when executed by one or more processors, cause the one or more processors to:
   identify a first range of cells in a base table of a spreadsheet application, the first range of cells specified in a first formula in the base table;
   receive a request to organize the base table into an organized table, organized table view, or a combination thereof, based upon commonalities within a particular row or column of the base table;
   organize rows and columns of the base table into the organized table, organized table view, or a combination thereof, grouping the rows and columns based upon the commonalities;
   convert, based on tracking via a coordinate system, a cell index system, or a combination of both, the first range of cells in the base table into a second range of cells of the organized table, such that the second range of cells of the organized table, organized table view, or a combination thereof, includes the same cells as the first range of cells in the base table, despite the organization of the rows and columns of the base table into the organized table, organized table view, or a combination thereof; and
   generate the organized table, organized table view, or a combination thereof, in the spreadsheet application with the first formula, substituting the second range of cells for the first range of cells.

2. The machine-readable medium of claim 1, comprising machine-readable instructions that, when executed by the one or more processors, cause the one or more processors to:
   convert the first range of cells to the second range of cells based on tracking via the coordinate system;
   wherein the coordinate system comprises a unique identification for each cell of the first range of cells in the base table, wherein the unique identification represents a cross intersection of a respective column and a respective row of the base table where each cell is located.

3. The machine-readable medium of claim 2, comprising machine-readable instructions that, when executed by the one or more processors, cause the one or more processors to:
   track movement of coordinates of the rows, columns, or both of base table caused by the organization; and
   convert the first range of cells into the second range of cells based upon the movement.

4. The machine-readable medium of claim 1, comprising machine-readable instructions that, when executed by the one or more processors, cause the one or more processors to:
   convert the first range of cells to the second range of cells based on tracking via the cell index system;
   wherein the cell index system comprises a direct mapping index that is generated using first indexes corresponding to the first range of cells, the mapping index providing an indication of index alterations from the first indexes that correspond to the second range of cells in the organized table, organized table view, or a combination thereof.

5. The machine-readable medium of claim 1, wherein base table and the organized table, organized table view, or a combination thereof, are displayed in different table views.

6. The machine-readable medium of claim 1, comprising machine-readable instructions that, when executed by the one or more processors, cause the one or more processors to:
   insert a summary header, a summary cell, or both during organization of the rows and columns of the base table into the organized table, organized table view, or a combination thereof;
   take into account the summary header, the summary cell, or both when converting the first range of cells in the base table into a second range of cells of the organized table, organized table view, or a combination thereof.

7. A tangible, non-transitory, machine-readable medium, comprising machine-readable instructions that, when executed by one or more processors, cause the one or more processors to:
   identify a first range of cells in a base table of a spreadsheet application, the first range of cells specified in a first formula in the base table;
   receive a request to organize the base table into an organized table, organized table view, or a combination thereof, based upon commonalities within a particular row or column of the base table;

organize rows and columns of the base table into the organized table, organized table view, or a combination thereof, grouping the rows and columns based upon the commonalities;

convert the first range of cells in the base table into a second range of cells of the organized table, such that the second range of cells of the organized table, organized table view, or a combination thereof, includes the same cells as the first range of cells in the base table, despite the organization of the rows and columns of the base table into the organized table, organized table view, or a combination thereof; and generate the organized table, organized table view, or a combination thereof, in the spreadsheet application with the first formula, substituting the second range of cells for the first range of cells, wherein the grouping causes the second range of cells in the organized table, organized table view, or a combination thereof, to be arranged in noncontiguous arrangement.

8. The machine-readable medium of claim 7, wherein a reference to the noncontiguous arrangement of the second range of cells comprises pipes used to indicate an aggregation of non-contiguous cell references.

9. The machine-readable medium of claim 8, wherein the non-contiguous cell references are selectively absolute or relative to the organized table, organized table view, or a combination thereof.

10. A tangible, non-transitory, machine-readable medium, comprising machine-readable instructions that, when executed by one or more processors, cause the one or more processors to:

generate an organized table, organized table view, or a combination thereof, in a spreadsheet application, by:
organizing rows and columns of a base table into the organized table, organized table view, or a combination thereof, grouping the rows and columns into groups based upon commonalities within a particular row, column, or both of the base table;
inserting a summary header, a summary cell, or both that provides a group summary based upon the grouping within the organized table, organized table view, or a combination thereof;
convert a first range of cells in a formula of the base table into a second range of cells of the organized table, organized table view, or a combination thereof, such that the second range of cells of the organized table, organized table view, or a combination thereof, includes the same cells as the first range of cells in the base table, despite the organization of the rows and columns of the base table into the organized table; and
substitute the second range of cells in the formula in the organized table, organized table view, or a combination thereof.

11. The machine-readable medium of claim 10, comprising machine-readable instructions, that when executed by the one or more processors, cause the one or more processors to:

receive an indication of a summary function to use for the summary cell; and insert the summary function into the summary cell, the summary function using a grouping range defined by an associated one of the groups as an argument.

12. The machine-readable medium of claim 11, wherein the summary function comprises one of a subtotal, an average, a median, or a range of the associated one of the groups.

13. The machine-readable medium of claim 10, comprising machine-readable instructions, that when executed by the one or more processors, cause the one or more processors to:

insert the summary cell; and render a summary reference for the summary cell, the summary reference comprising an indication of a row or column associated with the summary cell, a summary reference is a single reference used by a formula of a cell of the organized table, organized table view, or a combination thereof.

14. A system, comprising:
an electronic display, configured to display a graphical user interface (GUI) comprising a spreadsheet; and
one or more processors, configured to:
render, in the GUI, a base table;
identify a first range of cells in the base table that are specified in a first formula in the base table;
receive, via a selection in the GUI, a request to organize the base table into an organized table, organized table view, or a combination thereof, based upon commonalities within a particular row or column of the base table;
in response to receiving the request to organize the base table, generate a grouping dialog box that provides selectable grouping options;
organize rows and columns of the base table into the organized table, organized table view, or a combination thereof, in accordance with the selectable grouping options, grouping the rows and columns into groups based upon the commonalities;
convert the first range of cells in the base table into a second range of cells of the organized table, organized table view, or a combination thereof, such that the second range of cells of the organized table, organized table view, or a combination thereof, includes the same cells as the first range of cells in the base table, despite the organization of the rows and columns of the base table into the organized table, organized table view, or a combination thereof; and
generate the organized table, organized table view, or a combination thereof, in the GUI with the first formula, substituting the second range of cells for the first range of cells.

15. The system of claim 14, wherein the one or more processors are configured to identify the selectable grouping options based upon row headings, column headings, or both.

16. The system of claim 14, wherein the one or more processors are configured to:

insert a summary header that provides a group summary of at least one of the groups, based upon the grouping within the organized table, organized table view, or a combination thereof.

17. The system of claim 14, wherein the one or more processors are configured to:

insert a summary cell that provides a mathematical operation on values of at least one of the groups, based upon the grouping within the organized table, organized table view, or a combination thereof.

* * * * *